US007626750B2

(12) United States Patent
Kasai

(10) Patent No.: US 7,626,750 B2
(45) Date of Patent: Dec. 1, 2009

(54) ELECTRO-OPTICAL DEVICE, DRIVE CIRCUIT, AND ELECTRONIC APPARATUS

(75) Inventor: Toshiyuki Kasai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 311 days.

(21) Appl. No.: 11/781,038

(22) Filed: Jul. 20, 2007

(65) Prior Publication Data

US 2008/0037097 A1 Feb. 14, 2008

(30) Foreign Application Priority Data

Aug. 8, 2006 (JP) ............................. 2006-215386

(51) Int. Cl.
*G02F 1/01* (2006.01)
*G09G 3/30* (2006.01)

(52) U.S. Cl. ............................ 359/276; 345/76; 345/77

(58) Field of Classification Search ................. 359/276; 345/76, 77, 82, 87, 89, 102, 204
See application file for complete search history.

(56) References Cited

U.S. PATENT DOCUMENTS

2007/0262934 A1* 11/2007 Fujikawa et al. .............. 345/82
2008/0007499 A1* 1/2008 Kawabe ....................... 345/82

FOREIGN PATENT DOCUMENTS

JP A 8-39862 2/1996

* cited by examiner

*Primary Examiner*—Hung X Dang
*Assistant Examiner*—Tuyen Q Tra
(74) *Attorney, Agent, or Firm*—Oliff & Berridge, PLC

(57) ABSTRACT

Disclosed herein is an electro-optical device including: a plurality of electro-optical elements of which the intensity of emitted light is controlled according to drive signals; a plurality of unit circuits which output the drive signals; and a plurality of signal generation circuits which generate control signals according to correction data, wherein the plurality of unit circuits include a plurality of independent unit circuits which generate the drive signals according to the control signal generated by any of the plurality of signal generation circuits and gray scale levels of the electro-optical elements, and a dependent unit circuit which generates the drive signal according to a control signal supplied to a first independent unit circuit and a control signal supplied to a second independent unit circuit among the plurality of independent unit circuits and the gray scale levels of the electro-optical elements.

11 Claims, 9 Drawing Sheets

ELECTRO-OPTICAL DEVICE, DRIVE CIRCUIT, AND ELECTRONIC APPARATUS

BACKGROUND

1. Technical Field

The present invention relates to a technology of controlling light intensity (gray scale) of an electro-optical element such as a light-emitting element.

2. Related Art

In an electro-optical device in which a plurality of electro-optical elements are arranged, a variation in light intensity due to the characteristics of each electro-optical element or a characteristic variation of an active element for controlling each electro-optical element (an error in a design value or a difference between elements) becomes problematic. Accordingly, a variety of technologies for correcting a drive signal supplied to each electro-optical element according to the characteristic of each electro-optical element have been suggested. For example, JP-A-8-39862 (FIG. 6) discloses a structure in which a register for storing correction data according to the characteristic of a light-emitting element and a D/A converter for setting a current value of a drive signal according to the correction data are provided for each light-emitting element.

SUMMARY

However, in the structure disclosed in JP-A-8-39862, since the register and the D/A converter are individually provided in each of the light-emitting elements, the size of the drive circuit is increased and thus manufacturing cost is also increased. In particular, when the high-precision correction is desired due to the expansion of a correction data value range or the improvement of resolution, the size of the register or the D/A converter should increase and thus the above problem becomes serious. In consideration of such a situation, it is an advantage of the invention to reduce a variation in light intensity of each electro-optical element by a small-sized drive circuit.

An aspect of the invention, there is provided an electro-optical device including: a plurality of electro-optical elements for which the intensities of emitted light are controlled according to drive signals; a plurality of unit circuits which output the drive signals; and a plurality of signal generation circuits (for example, a current generation circuit 22 shown in FIG. 2) which generate control signals according to correction data, wherein the plurality of unit circuits include a plurality of independent unit circuits which generate the drive signals according to the control signal generated by any of the plurality of signal generation circuits and gray scale levels of the electro-optical elements, and a dependent unit circuit which generates the drive signal according to a control signal supplied to a first independent unit circuit and a control signal supplied to a second independent unit circuit among the plurality of independent unit circuits and the gray scale levels of the electro-optical elements. The control signal may be a current signal (for example, the control current $I_c$ shown in FIG. 2) or a voltage signal. Similarly, the drive signal may be a current signal or a voltage signal.

In the above-described configuration, since the drive signal of the dependent unit circuit is generated according to the control signal of the first independent unit circuit and the control signal of the second independent unit circuit (that is, the current value or the voltage value of the drive signal is set according to the control signals), a signal generation circuit for the dependent unit circuit is unnecessary. Accordingly, the drive circuit having a size smaller than that of a configuration in which the signal generation circuits (for example, D/A converters) are provided for all the unit circuits can be used and the unevenness of the light intensity of the electro-optical elements can be reduced.

In the suitable aspect of the invention, the plurality of electro-optical elements may be arranged in a predetermined direction, and an electro-optical element driven by the first independent unit circuit and an electro-optical element driven by the second independent unit may be arranged with an electro-optical element driven by the dependent unit circuit interposed therebetween in the predetermined direction. According to this aspect, since the light intensity of the electro-optical device driven by the dependent circuit is corrected according to the correction data of the adjacent electro-optical element (element driven by the independent unit circuit), the characteristics of the electro-optical elements arranged close to each other are similar and thus high-precision correction can be realized.

In a configuration in which the plurality of electro-optical elements are arranged in plural rows including a first row and a second row, the characteristics of the electro-optical elements of the respective rows may be different. Accordingly, in the configuration in which the plurality of electro-optical elements are arranged in plural rows, the dependent unit circuit (for example, an independent unit circuit Ub_G1 shorten in FIG. 6) for driving the electro-optical elements of the first row may generate the drive signal according to the control signals supplied to the first and second independent unit circuits (for example, an independent unit circuit Ua_G1 shown in FIG. 6) for driving the electro-optical elements of the first row, and the dependent unit circuit (for example, an independent unit circuit Ub_G2 shown in FIG. 6) for driving the electro-optical elements of the second row may generate the drive signal according to the control signals supplied to the first and second independent unit circuits (for example, an independent unit circuit Ua_G2 shown in FIG. 6) for driving the electro-optical elements of the second row. According to this aspect, since the light intensities of the electro-optical elements are separately corrected for each row, the unevenness of the light intensity of the electro-optical elements can be efficiently suppressed. The detailed example of this aspect will be described later as a second embodiment.

In a suitable aspect of the invention, the plurality of unit circuits may include a plurality of dependent unit circuits which generate the drive signals according to the control signal supplied to the first independent unit circuit, the control signal supplied to the second independent unit circuit and the gray scale levels of the electro-optical elements. In this aspect, since the drive signals of the plurality of dependent unit circuits are controlled according to the control signal of the first independent unit circuit and the control signal of the second independent unit circuits the number of signal generation circuits is further reduced compared with a configuration in which the drive signal of one dependent unit circuit is controlled according to the control signals. Accordingly, the size of the drive circuit is further reduced. The detailed example of this aspect will be described later as a third embodiment.

In a more detailed aspect, each of the plurality of dependent unit circuits may generate the drive signals according to a weighted average of the control signals, among which weighted values increase, in the control signal supplied to the independent unit circuit corresponding to an electro-optical element close to the electro-optical element driven by the dependent unit circuit. According to this aspect, the light quantities of the electro-optical elements driven by the plurality of dependent unit circuits are corrected such that the electro-optical element close to the aforementioned electro-optical element is largely influenced by the correction executed by the independent unit circuit. Accordingly, the number of signal generation circuits can be reduced and the light quantities of the electro-optical elements can be corrected with high precision. The detailed example of this aspect will be described later as a fourth embodiment.

In a more detailed aspect of the invention, the signal generation circuits may generate control currents having current values according to the correction data as the control signals, each of the independent unit circuits may include a first transistor (for example, a transistor $Q_1$) in which the control current flows and a second transistor (for example, a transistor $Q_2$) configuring a current mirror circuit together with the first transistor, and the dependent unit circuit includes a third transistor (for example, a transistor $R_1$) configuring the current mirror circuit together with the first transistor of the first independent unit circuit and a fourth transistor (for example, a transistor $R_2$) configuring the current mirror circuit together with the first transistor of the second independent unit circuit, and generate the drive signal by adding the currents flowing in the third transistor and the fourth transistor. According to this aspect, the drive signal of the dependent unit circuit can be generated by a simple configuration according to an average between the control signal of the first independent unit circuit and the control signal of the second independent unit circuit.

The plurality of unit circuits may include a plurality of dependent unit circuits which generate the drive signals according to the control signal supplied to the first independent unit circuit, the control signal supplied to the second independent unit circuit and the gray scale levels of the electro-optical elements, and, among the plurality of dependent unit circuits, a gain coefficient of the third transistor may be large in a dependent unit circuit corresponding to the electro-optical element close to an electro-optical element driven by the first independent unit circuit and a gain coefficient of the fourth transistor may be large in a dependent unit circuit corresponding to the electro-optical element close to an electro-optical element driven by the second independent unit circuit. According to this aspect, in the control signal supplied to the independent unit circuit corresponding to the electro-optical element close to the electro-optical element driven by the dependent unit circuit, the drive signal according to the weighted average of the control signals of which the weighted values increase is generated by the dependent unit circuit. Accordingly, the number of signal generation circuits can be reduced and the light quantities of the electro-optical elements can be corrected with high precision. Since the weighted value of the control signals is set according to the gain coefficients of the transistors, a special element for weighting the control signal is unnecessary.

In a more detailed aspect of the invention, each of the independent unit circuits may include a drive control transistor (for example, a drive control transistor $Q_{EL}$) which is turned on for a length of time according to the gray scale level of the electro-optical element provided on a path of current flowing in the second transistor, and each of the dependent unit circuits may include a drive control transistor (for example, a drive control transistor $R_{EL}$) which is provided on a path of current obtained by adding current flowing in the third transistor and current flowing in the fourth transistor and is turned on for a length of time according to the gray scale level of the electro-optical element. In this aspect, the current values of the drive signals of the unit circuits are controlled according to the correction data and the pulse widths of the drive signals are controlled according to the gray scale levels of the electro-optical elements.

Another aspect of the invention, there is provided an electro-optical device including: an electro-optical element for which the intensity of emitted light is controlled according to a drive signal; a signal generation circuit which generates a control signal according to correction data; and a plurality of unit circuits, each of which generates the drive signal according to the control signal generated by the signal generation circuit and gray scale level of the electro-optical element. According to this aspect, since one signal generation signal is shared by the plurality of unit circuits, the drive circuit has a small size and a simple configuration compared with a configuration in which the signal generation signals are provided for all the unit circuits.

An electro-optical device according to the invention is used in a variety of electronic apparatuses. A typical example of the electronic apparatus according to the invention is an electrophotographic image forming apparatus using the electro-optical device according to each of the above-described aspects in the exposure of an image carrier such as a photosensitive drum. This image forming apparatus includes an image carrier on which a latent image is formed by exposure, the electro-optical device according to the invention for exposing the image carrier, and a developer for forming an image by attaching a development agent (for example, a toner) to the latent image of the image carrier. The use of the electro-optical device according to the invention is not limited to the exposure of the image carrier. For example, in an image reading apparatus such as a scanner, the electro-optical device according to the invention can be used in the illumination of an original material. This image reading apparatus includes the electro-optical device according to each of the above-described embodiments and a light-receiving device (for example, a light-receiving element such as a charge coupled device (CCD)) for converting the light reflected from a read target (original material) into an electrical signal. The electro-optical device in which electro-optical elements are arranged in a matrix is also used as a display device of a variety of electronic apparatuses such as a personal computer or a mobile telephone.

The invention is specified as a circuit for driving the electro-optical device according to each of the above-described aspects. According to another aspect of the invention, there is provided a drive circuit for driving a plurality of electro-optical elements by supplying drive signals, the drive circuit including a plurality of unit circuits which output the drive signals; and a plurality of signal generation circuits which generate control signals according to correction data, wherein the plurality of unit circuits include a plurality of independent unit circuits which generate the drive signals according to the control signal generated by any of the plurality of signal generation circuits and gray scale levels of the electro-optical elements, and a dependent unit circuit which generates the drive signal according to a control signal supplied to a first independent unit circuit and a control signal supplied to a second independent unit circuit among the plurality of independent unit circuits and the gray scale levels of the electro-optical elements. In this driving circuit, the same operation and effect as the electro-optical device according to the invention are obtained.

BRIEF DESCRIPTION OF THE DRAWINGS

The invention will be described reference to the accompanying drawings, wherein like numbers reference like elements.

DESCRIPTION OF EXEMPLARY EMBODIMENTS

A: First Embodiment

Figure 1:
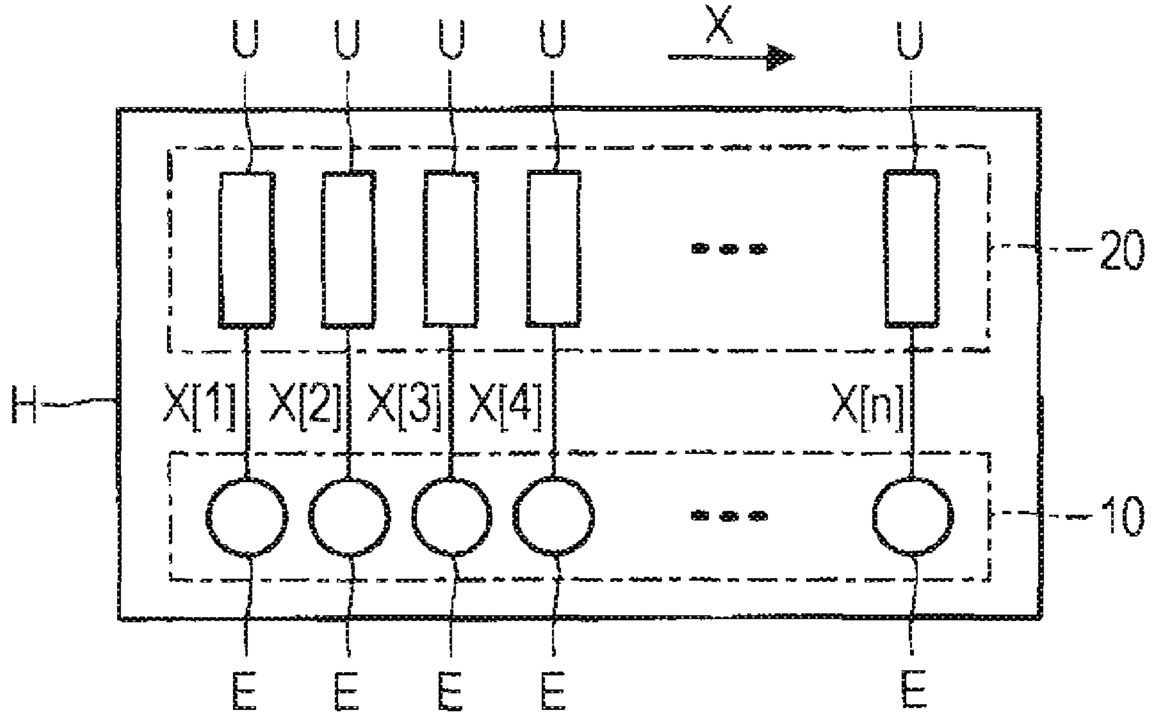
FIG. 1 is a block diagram showing the configuration of an electro-optical device according to a first embodiment.

FIG. 1 is a block diagram showing the configuration of an electro-optical device according to a first embodiment of the invention. The electro-optical device H is used in an electrophotographic image forming apparatus as a line head (exposure device) for exposing a photosensitive drum and includes an element portion 10 and a drive circuit 20 as shown in FIG. 1.

The element portion 10 includes n electro-optical elements E which are arranged in a row in an X direction (main scan direction). Each electro-optical element E is an organic light-emitting diode in which a light-emitting layer made of an organic electroluminescence material is interposed between a cathode and an anode which face each other. The surface of the photosensitive drum is exposed by light emitted from each electro-optical element E. When one of a plurality of elements having a common property or configuration is individually focused upon, a subscript [i] (i is an integer which satisfies $1 \leqq i \leqq n$) may be attached to the reference numeral of the element. When it is not necessary to focus upon a specific one of the plurality of elements, the subscript [i] of the reference numeral is omitted.

The drive circuit 20 is a circuit for driving the electro-optical elements E by outputting drive signals X[1] to X[n] according to an external instruction. The drive circuit 20 may include one or a plurality of IC chips or a plurality of active elements (for example, thin-film transistors in which a semiconductor layer is made of low-temperature polysilicon) formed on the surface of a substrate in correspondence with the electro-optical elements E.

Figure 2:
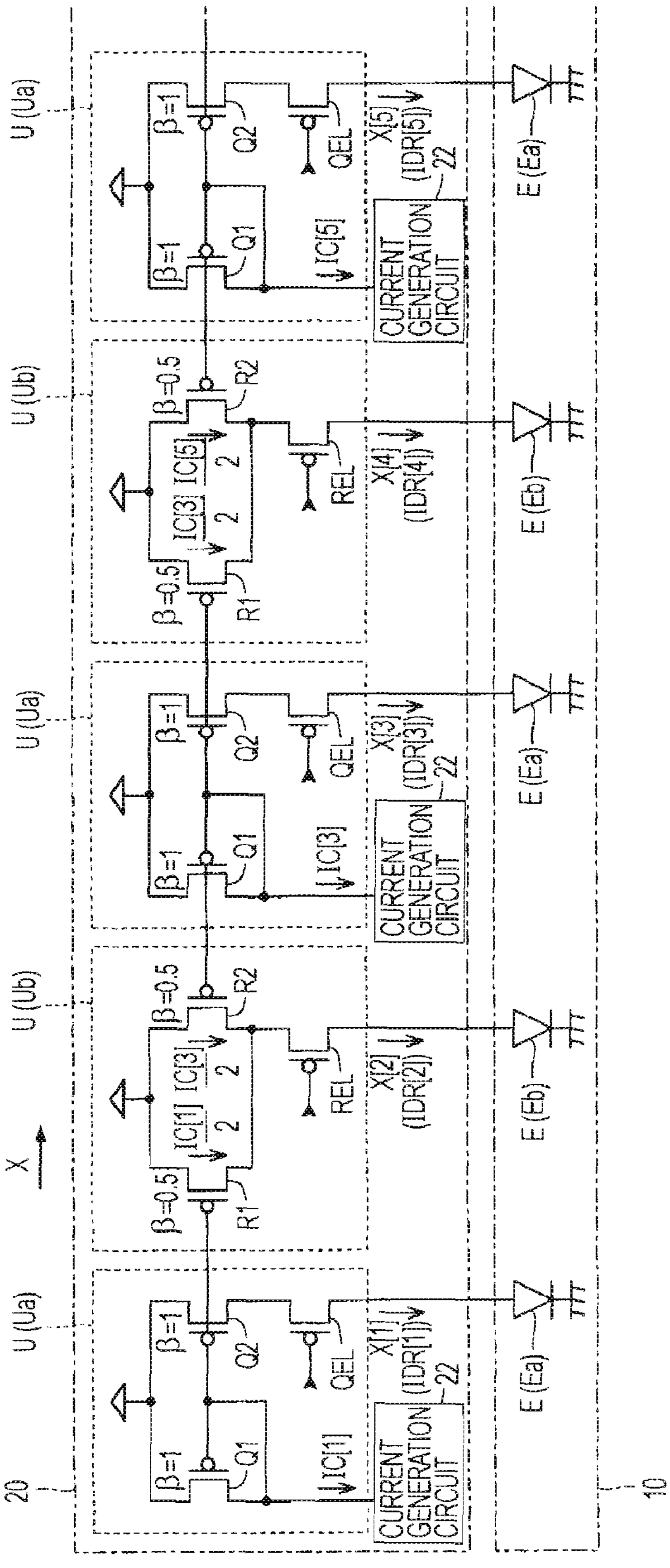
FIG. 2 is a block diagram showing the detailed configuration of a drive circuit and an element portion.

FIG. 2 is a block diagram showing the detailed configuration of the element portion 10 and the drive circuit 20. As shown in FIGS. 1 and 2, the drive circuit 20 includes n unit circuits U (Ua and Ub) corresponding to the electro-optical elements E and n/2 current generation circuits 22. In FIG. 1 the current generation circuits 22 are not shown. An $i^{th}$ unit circuit U controls the light intensity (gray scale) of an $i^{th}$ electro-optical element E according to the generation and the output of the drive signal X[i].

Figure 3:
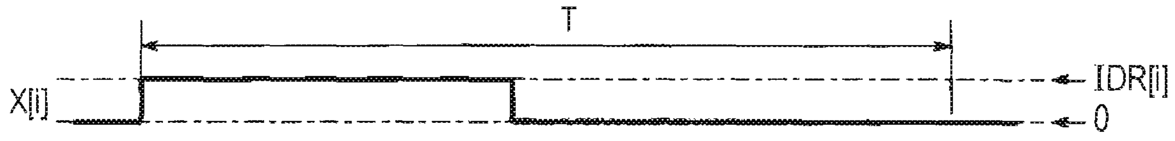
FIG. 3 is a timing chart showing the waveform of a drive signal X[i]

FIG. 3 is a timing chart showing the waveform of the drive signal X[i] (X[1] to X[n]) As shown in FIG. 3, the drive signal X[i] is a current signal in which a current value becomes that of a drive current $I_{DR}$[i] for a length of time according to the gray scale applied to the $i^{th}$ electro-optical element E in a predetermined unit period (for example, a horizontal scan period) T and becomes zero for the remainder of the unit period T. The light intensities of the electro-optical elements E are individually controlled by the drive signals X[1] to X[n] such that a latent image according to a desired image is formed on the surface of the photosensitive drum.

As shown in FIG. 2, n unit circuits U configuring the drive circuit 20 are divided into independent unit circuits Ua and dependent unit circuits Ub. In the present embodiment, odd-numbered unit circuits U are the independent unit circuits Ua and even-numbered unit circuits U are the dependent unit circuits Ub. Each of n/2 current generation circuits 22 is provided in correspondence with one independent unit circuit Ua and is electrically connected to the independent unit circuit Ua. In contrast, each current generation circuit 22 is not connected to one of the dependent unit circuits Ub. As described above, in the present embodiment, the current generation circuits 22 are not provided for all the unit circuits U, that is, the current generation circuits 22 are provided for only the independent unit circuits Ua. Hereinafter, electro-optical elements E (that is, odd-numbered electro-optical elements E) driven by the independent unit circuits Ua may be denoted as “electro-optical elements Ea” and electro-optical elements E (that is, even-numbered electro-optical elements E) driven by the dependent unit circuits Ub may be denoted as an “electro-optical element Eb” such that both types of element are formally distinguished from each other. As can be seen from FIG. 2, the electro-optical elements Ea are arranged in the X direction with one of the electro-optical elements Eb interposed between each pair thereof.

Figure 4:
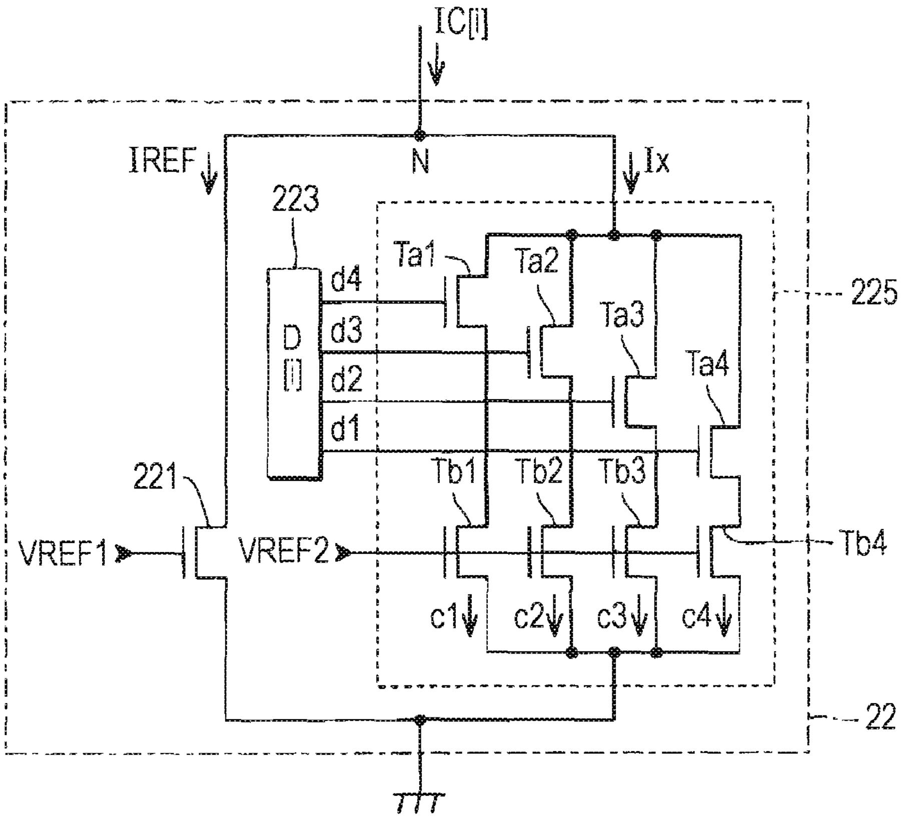
FIG. 4 is a block diagram showing the configuration of a current generation circuit.

Each of the current generation circuits 22 shown in FIG. 2 generates a control current $I_c$[i] used as the drive current $I_{DR}$[i] of the drive signal X[i] in each of the independent unit circuits Ua. FIG. 4 is a circuit diagram showing the detailed configuration of the current generation circuit 22. Only one current generation circuit 22 corresponding to an $i^{th}$ independent unit circuit Ua is shown in FIG. 4, but all the current generation circuits 22 have the same configuration. The current generation circuit 22 includes a reference current source 221, a storage portion 223, and a D/A converter 225. The reference current source 221 is an n-channel-type transistor for generating reference current $I_{REF}$ according to a reference voltage $V_{REF1}$ applied to the gate thereof.

The storage portion 223 stores correction data D[i] . The correction data D[i] is 4-bit (bits d1 to d4) digital data for specifying the correction amount of the drive current $I_{DR}$[i] of the drive signal X[i] generated by the independent unit circuit Ua. The storage portion 223 may be a non-volatile memory for storing correction data D[i] which is stored at the time of manufacturing the electro-optical device or a volatile memory for storing correction data D[i] supplied externally whenever power is supplied to the electro-optical device H.

The D/A converter 225 generates a correction current $I_x$ according to the correction data D[i] stored in the storage portion 223, and includes four n-channel-type transistors Ta (Ta1 to Ta4) corresponding to the number of bits of the correction data D[i] and four n-channel-type transistors Tb (Tb1 to Tb4) whose the sources are connected to the drains of the transistors Ta. The sources of the transistors Ta and the source of the reference current source 221 are connected to a node N and the drains of the transistors Tb and the drain of the reference current source 221 are connected to ground.

The transistors Tb1 to Tb4 are provided as current sources for generating current according to a reference voltage $V_{REF2}$ applied to the gates thereof. The characteristics (for example, gain coefficients of the transistors Tb1 to Tb4 are selected such that a relative ratio of current values of currents c1 to c4 which flow in response to the application of the reference voltage $V_{REF2}$ to the gates thereof becomes 2 (c1:c2:c3:c4=1:2:4:8). In contrast, the transistors Ta1 to Ta4 are selectively turned on according to the bits d1 to d4 of the correction data D[i] stored in the storage portion 223. Accordingly, the correction current Ix having the current value according to the correction data D[i] flows in a path from the node n to the D/A converter 225. By the above configuration, control current $I_c$[i] obtained by adding the reference current $I_{REF}$ and the correction current $I_x$ flows into the node N.

Next, the detailed configuration of each unit circuit U will be described with reference to FIG. 2. As shown in FIG. 2, each independent unit circuit Ua includes transistors $Q_1$ and $Q_2$ and a drive control transistor $Q_{EL}$. The sources of the transistors $Q_1$ and $Q_2$ are connected to a high-power power source. The drain of the transistor $Q_1$ is connected to the node N of the current generation circuit 22 and the gate of the transistor $Q_1$. The gates of the transistors $Q_1$ and $Q_2$ are connected to each other to configure a current mirror circuit.

In the above configuration, when the control current $I_c$[i] generated by the current generation circuit 22 flows between the source and the drain of the transistor $Q_1$, the drive current $I_{DR}$[i] corresponding to the control current $I_c$[i] is generated between the source and the drain of the transistor $Q_2$ in the $i^{th}$ independent unit circuit Ua. The size (channel width or channel length) of the transistor $Q_2$ of the present embodiment is selected such that a gain coefficient β thereof is equal to that of the transistor $Q_1$ (β=1). Accordingly, the current value of the drive current $I_{DR}$[i] in the independent unit circuit Ua is equal to that of the control current $I_c$[i] That is, the drive current $I_{DR}$[i] of the independent unit circuit Ua has a current value corrected according to the correction data D[i]. The correction data D[i] is previously set according to the characteristic of each electro-optical element Ea such that the light intensity when the drive current $I_{DR}$[i] is supplied to the electro-optical element Ea is adjusted to a predetermined value (that is, the intensities of the light emitted from all the electro-optical elements Ea become uniform).

The drive control transistor $Q_{EL}$ is a p-channel-type transistor provided on a path of the drive current $I_{DR}$[i] generated by the transistor $Q_2$ and is selectively turned on for a length of time according to the gray scale level of the electro-optical element E (with time density according to the gray scale). When the drive control transistor $Q_{EL}$ is turned on, the drive current $I_{DR}$[i] generated by the transistor $Q_2$ is supplied to the electro-optical element Ea, and, when the drive control transistor $Q_{EL}$ is turned off, the drive current $I_{DR}$[i] supplied to the electro-optical element Ea is stopped. Accordingly, the drive signal X[i] generated by the independent unit circuit Ua becomes the drive current $I_{DR}$[i] corresponding to the correction data D[i] over the pulse width according to the gray scale level of the electro-optical element Ea.

As shown in FIG. 2, the dependent unit circuit Ub includes transistors $R_1$ and $R_2$ and a drive control transistor $R_{EL}$. The sources of the transistors $R_1$ and $R_2$ are connected to a high-power power source and the drains thereof are connected to the source of the transistor $R_{EL}$. As shown in FIG. 2, the gate of the transistor $R_1$ in an $i^{th}$ dependent unit circuit Ub is connected to the gates of the transistors $Q_1$ and $Q_2$ in an $(i-1)^{th}$ independent unit circuit Ua which is adjacent in the negative X direction (that is, the independent unit circuit Ua for driving the electro-optical element Ea adjacent to the electro-optical element Eb driven by the dependent unit circuit Ub in the negative X direction). The gate of the transistor $R_2$ in the $i^{th}$ dependent unit circuit Ub is connected to the gates of the transistors $Q_1$ and $Q_2$ in an $(i+1)^{th}$ independent unit circuit Ua which is adjacent in the positive X direction (that is, the independent unit circuit Ua for driving the electro-optical element Ea adjacent to the electro-optical element Eb driven by the dependent unit circuit Ub in the positive X direction). As described above, the transistor $R_1$ of the $i^{th}$ dependent unit circuit Ub configures the current mirror circuit together with the transistors $Q_1$ and $Q_2$ of the $(i-1)^{th}$ independent unit circuit Ua (corresponding to a first independent unit circuit in the invention) and the transistor $R_2$ of the dependent unit circuit Ub configures the current mirror circuit together with the transistors $Q_1$ and $Q_2$ of the $(i+1)^{th}$ independent unit circuit Ua (corresponding to a second independent unit circuit in the invention).

As shown in FIG. 2, the size (channel width or channel length) of the transistor $R_1$ of each dependent unit circuit Ub is selected such that the gain coefficient β thereof becomes half (β=0.5) that of the transistor $Q_1$ of the independent unit circuit Ua. Accordingly, current $I_c$[i−1]/2 which is half the control current $I_c$[i−1] used in the $(i-1)^{th}$ independent unit circuit Ua flows in the transistor $R_1$ of the $i^{th}$ dependent unit circuit Ub. Similarly, since the gain coefficient of the transistor $R_2$ is half (β=0.5) that of the transistor $Q_2$, current $I_c$[i+1]/2 which is half the control current $I_c$[i+1] used in the $(i+1)^{th}$ independent unit circuit Ua flows in the transistor $R_2$ of the $i^{th}$ dependent unit circuit Ub. In the $i^{th}$ dependent unit circuit Ub, the current obtained by adding the current flowing in the transistor $R_1$ and the current flowing in the transistor $R_2$ is used as the drive current $I_{DR}$[i]. Accordingly, the drive current $I_{DR}$[i] in the $i^{th}$ dependent unit circuit Ub has a current value corresponding to an arithmetic average of the control current $I_c$[i−1] supplied to the $(i-1)^{th}$ independent unit circuit Ua and the control current $I_c$[i+1] supplied to the $(i+1)^{th}$ independent unit circuit Ua (or an arithmetic average of the drive current $I_{DR}$[i−1] and the drive current $I_{DR}$[i+1]. For example, the drive current $I_{DR}$[2] used in the second dependent unit circuit Ub from the left of FIG. 2 is an arithmetic average of the control current $I_c$[1] and the control current $I_c$[3].

The drive control transistor $R_{EL}$ is a p-channel-type transistor provided on the path of the drive current $I_{DR}$[i]. If the drive control transistor $R_{EL}$ is turned on, the drive current $I_{DR}$[i] is supplied to the electro-optical element Eb and, if the drive control transistor $R_{EL}$ is turned off, the supply of the drive current $I_{DR}$[i] to the electro-optical element Eb is stopped. That is, the drive signal X[i] generated by the $i^{th}$ dependent unit circuit Ub becomes the drive current $I_{DR}$[i] according to the control current $I_c$[i−1] supplied to the $i-1^{th}$ independent unit circuit Ua and the control current $I_c$[i+1] supplied to the $i+1^{th}$ independent unit circuit Ua (that is, according to correction data D[i−1] and correction data D[i+1]) over the pulse width according to the gray scale level of the $i^{th}$ electro-optical element Eb.

As described above, in the present embodiment, since the current generation circuit 22 is not provided for the dependent unit circuit Ub, the number of current generation circuits 22 mounted in the drive circuit 20 is reduced compared with the configuration of Patent Document 1 in which the current generation circuits 22 are provided for all the unit circuits U. Accordingly, the size of the drive circuit 20 can be reduced and manufacturing cost can be reduced. That is, for example, if a size equal to that of the configuration of Patent Document 1 in which the current generation circuits 22 are provided for all the unit circuits is allowed in the drive circuit 20, the resolution of the correction of the drive current $I_{DR}$ can be increased (the number of bits of the correction data D can be increased), compared with the configuration of Patent Document 1

As described above, the drive current $I_{DR}$[i] in the dependent unit circuit Ub is set in accordance with the control current $i_c$[i−1] corresponding to the correction data D[i−1] and the control current $i_c$[i+1] corresponding to the correction data D[i+1] However, in each active element configuring the drive circuit 20 or each electro-optical element E of the element portion 10, elements arranged close to each other have similar characteristics. Accordingly, according to the invention in which the arithmetic average of the control currents $I_c$ of the two independent unit circuits Ua adjacent to each other in the X direction becomes the drive current $I_{DR}$ of the dependent unit circuit Ub, the unevenness of the light intensity of the electro-optical elements E is efficiently reduced although the drive current $I_{DR}$ of the dependent unit circuit Ub is not corrected independently of the drive current $I_{DR}$ of the other unit circuit U.

B. Second Embodiment

Next, a second embodiment of the invention will be described. In the following embodiment, the same elements as the first embodiment are denoted by the same reference numerals and thus the detailed description thereof will be properly omitted.

Figure 5:
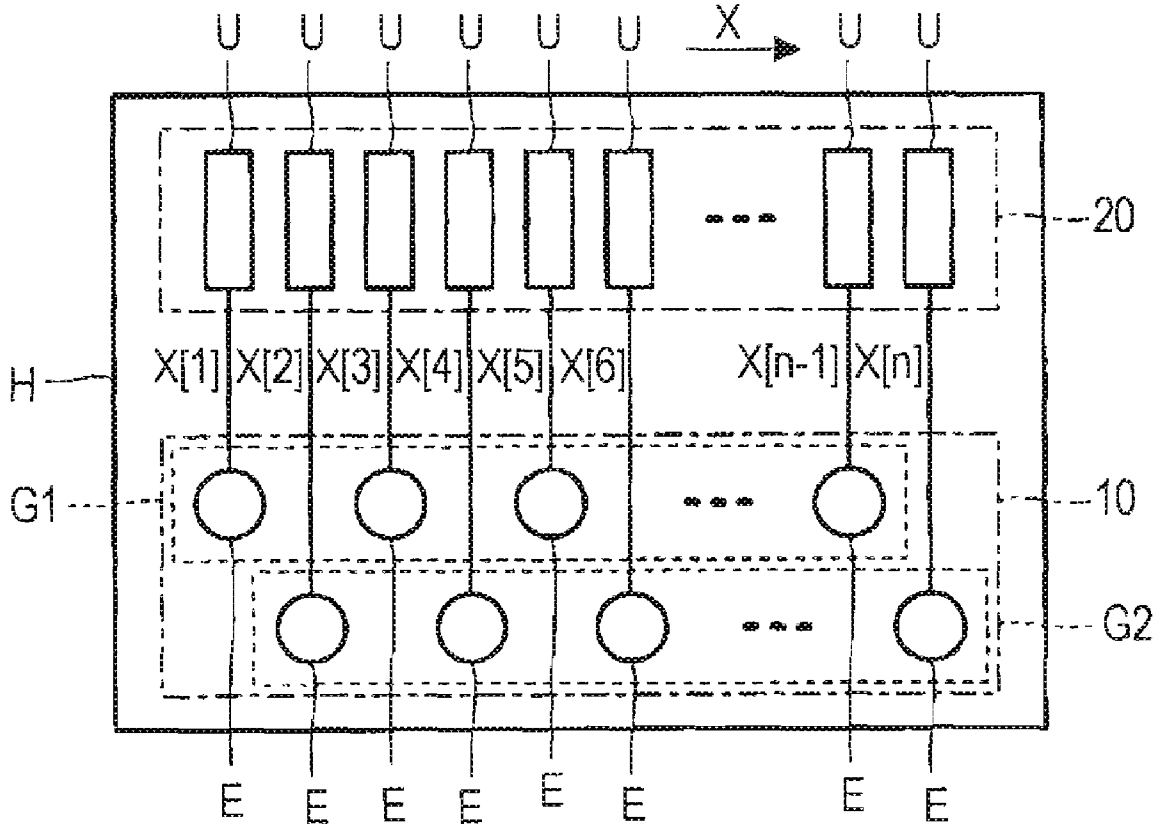
FIG. 5 is a block diagram showing the configuration of an electro-optical device according to a second embodiment.
Figure 6:
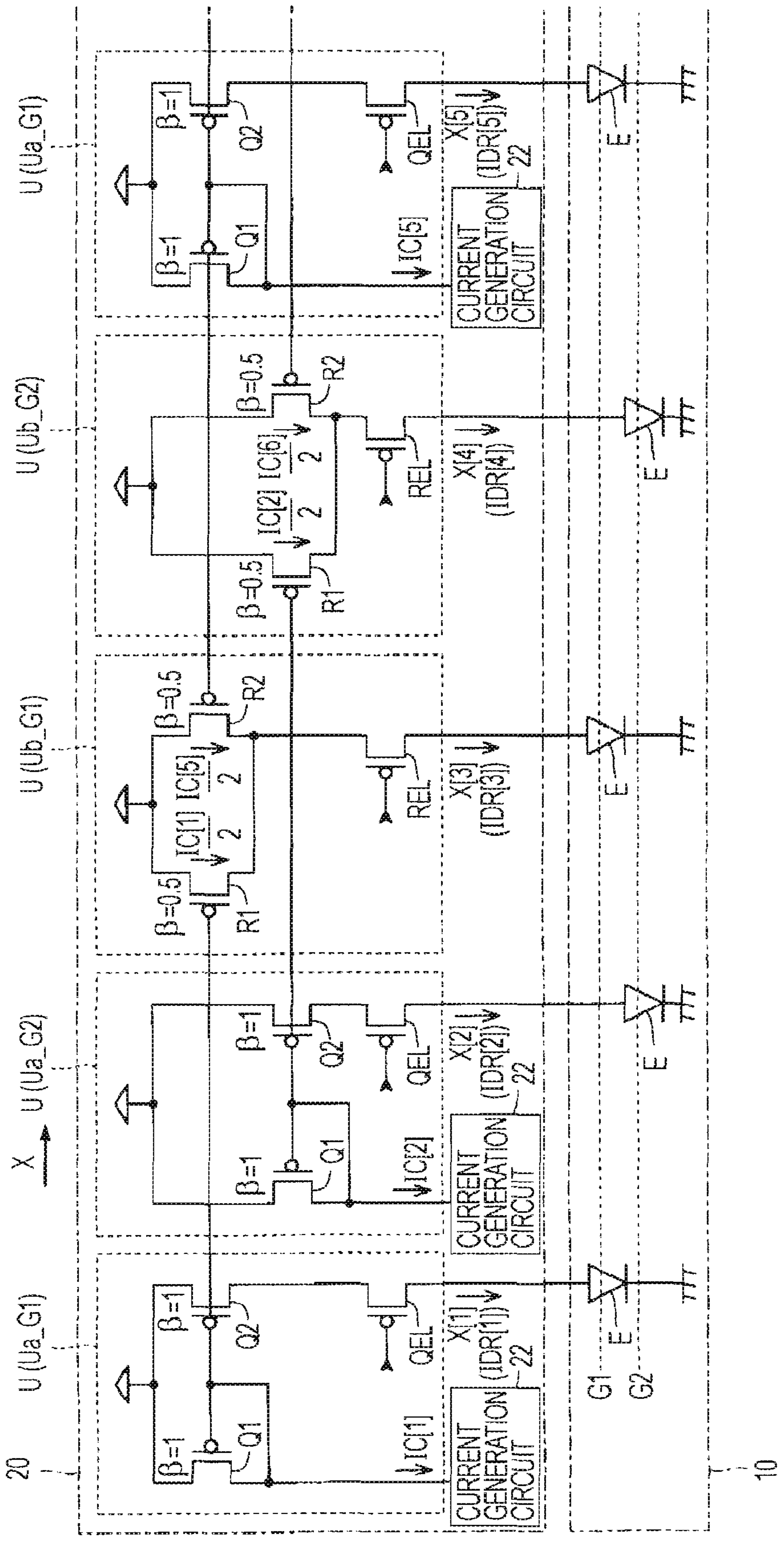
FIG. 6 is a block diagram snowing the detailed configuration of a drive circuit and an element portion.

FIG. 5 is a block diagram showing the configuration of an electro-optical device H, and FIG. 6 is a block diagram, showing the detailed configuration of an element portion 10 and a drive circuit 20. As shown in FIG. 5, n electro-optical elements E configuring the element portion 10 of the present embodiment are arranged in two rows (element rows G1 and G2) in an X direction. The electro-optical elements E belonging to the element rows G1 and the electro-optical elements E belonging to the element rows G2 are different in the position of the X direction. That is, the n electro-optical elements E are arranged in a zigzag shape. According to such an arrangement, since the pitch between the electro-optical elements E in the X direction is narrow compared with the configuration in which the plurality of electro-optical elements E are arranged in a row, it is possible to form a high-precision latent image on the surface of a photosensitive drum.

In the configuration shown in FIG. 5 the electro-optical elements E of the element row G1 and the electro-optical elements E of the element row G2 are different in a layout (in particular, a relationship between each electro-optical element and the other element). For example, while wirings for connecting the electro-optical elements E of the element row G2 and the drive circuit 20 are provided in gaps between the electro-optical elements E belonging to the element row G1, wirings are not provided in the gaps between the electro-optical elements E belonging to the element row G2. Due to such a difference, the electro-optical elements E of the element row G1 and the electro-optical element E of the element row G2 are different in the characteristics. In contrast, the characteristics are similar between the electro-optical elements E arranged close to each other in the element row G1 and between the electro-optical elements E arranged close to each other in the element row G2, similar to the first embodiment. Accordingly, in the present embodiment, the drive current $I_{DR}$ is separately corrected in the element rows G1 and G2.

As shown in FIG. 6, the n unit circuits U configuring the drive circuit 20 is divided into independent unit circuits Ua_G1 and dependent unit circuits Ub_G1 for driving the electro-optical elements E of the element row G1 and independent unit circuits Ua_G2 and dependent unit circuits Ub_G2 for driving the electro-optical elements E of the element row G2. Control currents $I_c$ are supplied from current generation circuits 22 to the independent unit circuit Ua_G1 and the independent unit circuit Ua_G2.

The gate of a transistor $R_1$ of each dependent unit circuit Ub_G1 (for example, a third unit circuit U from the left of FIG. 6) is connected to the gates of transistors $Q_1$ and $Q_2$ of the independent unit circuit Ua_G1 closest to the dependent unit circuit Ub_G1 at the negative side of the X direction (for example, a first unit circuit U from the left of FIG. 6). The gate of a transistor $R_2$ of each dependent unit circuit Ub_G1 is connected to the gates of transistors $Q_1$ and $Q_2$ of the independent unit circuit Ua_G1 closest to the dependent unit circuit Ub_G1 at the positive side of the X direction (for example, a fifth unit circuit U from the left of FIG. 6). Accordingly, the drive current $I_{DR}$[i] of an $i^{th}$ dependent unit circuit Ub_G1 has a current value according to the control current $I_c$[i−2] supplied to an $(i-2)^{th}$ independent unit circuit Ua_G1 and the control current $I_c$[i+2] supplied to an $(i+2)^{th}$ independent unit circuit Ua_G1. For example, the drive current $I_{DR}$[3] in FIG. 6 has an arithmetic average between control current $I_c$[1] and control current $I_c$[5] (a current value according to correction data D[1] and D[5]).

The same is true in the unit circuits U (Ua_G2 and Ub_G2) for driving the electro-optical elements E of the element row G2. That is, the drive current $I_{DR}$[i] of the $i^{th}$ dependent unit circuit Ub_G2 has a current value according to the control current $I_c$[i−2] of an $(i-2)^{th}$ independent unit circuit Ua_G2 and the control current $I_c$[i+2] of an $(i+2)^{th}$ independent unit circuit Ua_G2. For example, the drive current $I_{DR}$[4] of the fourth dependent unit circuit Ub_G2 from the left of FIG. 6 has a current value according to control currents $I_c$[2] and $I_c$[6].

As described above, even in the present embodiment, since the current generation circuit 22 is not provided for the dependent unit circuits Ub (Ub_G1 and Ub_G2), the same operation and effect as the first embodiment are obtained. According to the present embodiment, since the current value of the drive current $I_{DR}$ is separately set in the element rows G1 and G2, the light intensity of the electro-optical elements E becomes uniform although the characteristics of the electro-optical elements E are different for each element row. The number of rows in which the plurality of electro-optical elements are arranged is not limited to the above example. For examples the plurality of electro-optical elements may be arranged in three rows.

C: Third Embodiment

Although, in the above-described embodiments, the current generation circuits 22 are provided for the n/2 independent unit circuits Ua among the n unit circuits U, the number of current generation circuits 22 (a ratio of the independent unit circuit Ua to the dependent unit circuit Ub) may be changed. Hereinafter, an embodiment in which n/3 independent unit circuits Ua are included in n unit circuits U. Hereinafter, n electro-optical elements E are arranged in a row, like the first embodiment. However, the present embodiment may apply to the second embodiment in which the electro-optical elements are arranged in plural rows.

Figure 7:
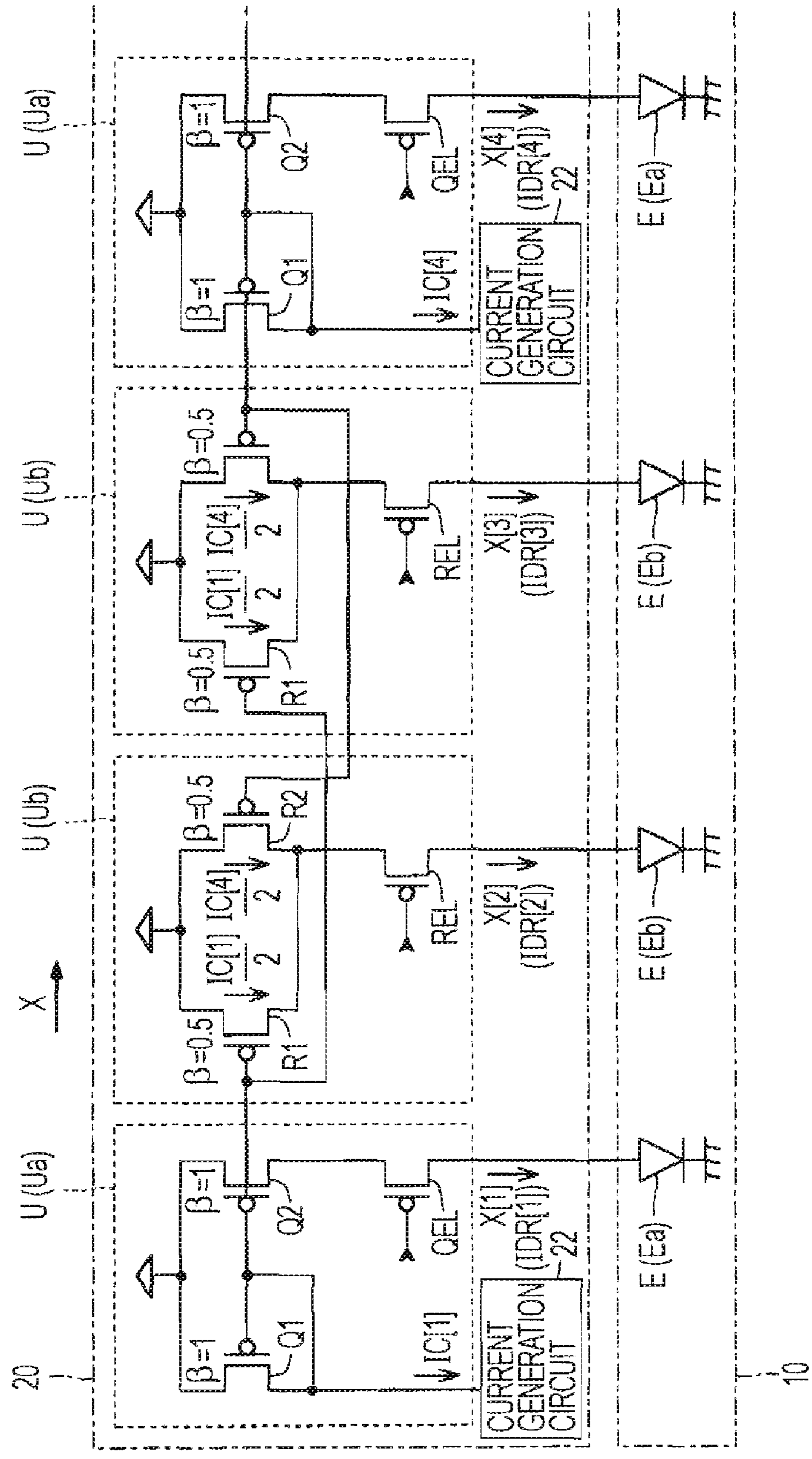
FIG. 7 is a block diagram showing the detailed configuration of a drive circuit and an element portion according to a third embodiment.

FIG. 7 is a block diagram showing the detailed configuration of an element portion 10 and a drive circuit 20 according to the present embodiment. As shown in FIG. 7, n/3 unit circuits U which are selected from n unit circuits U configuring the drive circuit 20 every third unit circuit in an X direction are independent unit circuits Ua. That is, two dependent unit circuits Ub are interposed between the independent unit circuits Ua arranged close to each other in the X direction.

As shown in FIG. 7, in an $i^{th}$ dependent unit circuit Ub (for example, a second dependent unit circuit from the left of FIG. 7) and an $(i+1)^{th}$ dependent unit circuit Ub, the gate of a transistor $R_1$ is commonly connected to transistors $Q_1$ and $Q_2$ of an $(i-1)^{th}$ independent unit circuit Ua which is closest at the negative side of the X direction, and the gate of a transistor $R_2$ is commonly connected to transistors $Q_1$ and $Q_2$ of an $(i+2)^{th}$ independent unit circuit Ua which is closest at the positive side of the X direction. Accordingly, the drive currents $I_{DR}[i]$ and $I_{DR}[i+1]$ in the dependent unit circuits Ub have an arithmetic average between control current $I_c[i-1]$ and $I_c[i+2]$.

As described above, according to the present embodiment, the number of the current generation circuits 22 mounted in the drive circuit 20 is reduced to ⅓ of that of the configuration in which the current generation circuits 22 are provided for all the unit circuits U. Accordingly, the effect that the size of the drive circuit is reduced and the effect that the resolution of the correction increases (the number of bits of correction data D increases) while maintaining the size of the drive circuit 20 are further improved compared with the first embodiment or the second embodiment.

D: Fourth Embodiment

In the configuration shown in FIG. 7, the current values of the drive currents $I_{DR}$ in the dependent unit circuits Ub arranged close to each other become equal. Accordingly, the correction amounts of the light quantities of the electro-optical elements Eb driven by the dependent unit circuits arranged close to each other are equal. However, since the characteristics of the electro-optical elements Eb arranged close to each other may be different, the unevenness of the light intensity in the element portion 10 may not be sufficiently suppressed although the light quantities of the electro-optical elements Eb are corrected by the same intensity. Accordingly, in the present embodiment; the drive currents $I_{DR}$ of the dependent unit circuits Ub arranged close to each other may be separately set while using as many current generation circuits 22 as the number of current generation circuits in the third embodiment.

Figure 8:
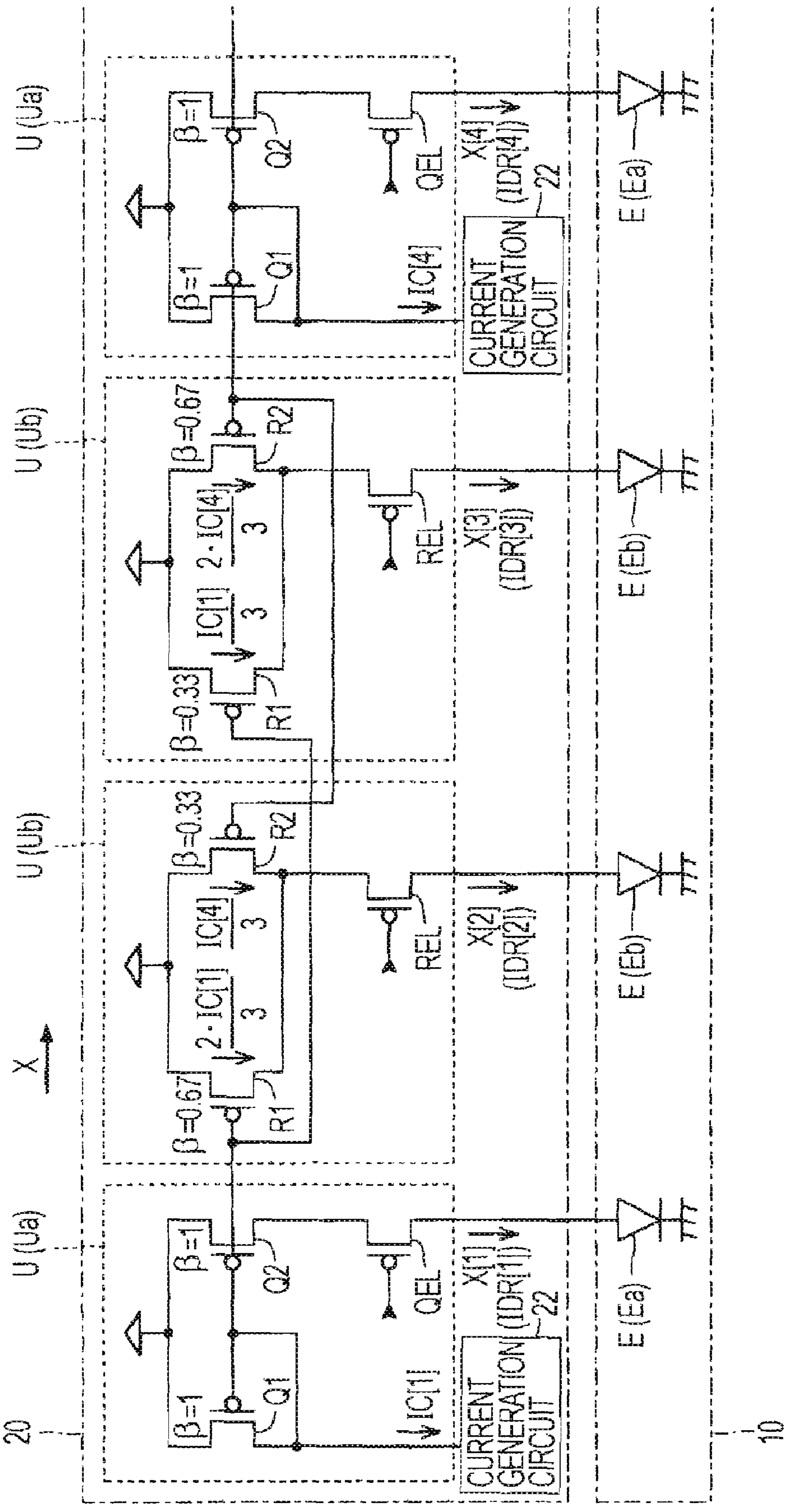
FIG. 8 is a block diagram showing the detailed configuration of a drive circuit and an element portion according to a fourth embodiment.

FIG. 8 is a block diagram showing the detailed configuration of an element portion 10 and a drive circuit 20. As shown FIG. 8, the present embodiment is equal to the third embodiment in the configuration (in particular, an electrical connection between elements) of the drive circuit 20, but is different from the third embodiment in the gain coefficients β of the transistor $R_1$ and $R_2$ in the dependent unit circuits Ub arranged close to each other are different.

The characteristics of the electro-optical elements E or the active elements vary according to the arrangement step by step. Accordingly, an electro-optical element Eb close to one electro-optical element Ea has the characteristics close to those of the electro-optical element Ea. In consideration of such a tendency, in the present embodiment; the characteristics of the transistors $R_1$ and $R_2$ are separately selected for each dependent unit circuit Ub such that the drive current $I_{DR}$ of the electro-optical element Eb close to one electro-optical element Ea among the plurality of electro-optical elements Eb driven by the dependent unit circuit Ub arranged close to each other is largely influenced by the correction of the light intensity of the electro-optical element Ea.

In more detail, as shown in FIG. 8, in the transistors $R_1$ and $R_2$ in one of the dependent unit circuits Ub connected to the independent unit circuit Ua, the transistor contained in the dependent unit circuit Ub close to the independent unit circuit Ua (dependent unit circuit Ub for driving the electro-optical element Eb close to the electro-optical element Ea corresponding to the independent unit circuit Ua) has a larger gain coefficient β. For example, since a second dependent unit circuit Ub from the left of FIG. 8 is close to a first independent unit circuit Ua compared with a third dependent unit circuit Ub, the gain coefficient β of the transistor $R_1$ in the second dependent unit circuit Ub is set to 0.67 which is larger than the gain coefficient β (=0.33) of the transistor $R_1$ in the third dependent unit circuit Ub. Similarly, since the third dependent unit circuit Ub in FIG. 8 is close to a fourth independent unit circuit Ua compared with the second dependent unit circuit Ub, the gain coefficient β of the transistor $R_2$ in the third dependent unit Ub is set to 0.67 which is larger than the gain coefficient β (=0.33) of the transistor $R_2$ in the second dependent unit circuit Ub.

As can be seen from FIG. 8, the drive currents $I_{DR}$[2] and $I_{DR}$[3] have the following current value by selecting the characteristics (for example, the channel width or the channel length) of the transistors as described above.

$$
\begin{aligned}
I_{DR}[2] &= (2/3)\times I_{DR}[1] + (1/3)\times I_{DR}[4] \\
&= (2/3)\times I_C[1] + (1/3)\times I_C[4] \\
I_{DR}[3] &= (1/3)\times I_{DR}[1] + (2/3)\times I_{DR}[4] \\
&= (1/3)\times I_C[1] + (2/3)\times I_C[4]
\end{aligned}
$$

That is, the drive current $I_{DR}$ generated at one dependent unit circuit Ub has a weighted average of the control currents $I_c$ of which weighted values increase, in the control current $I_c$ supplied to the independent unit circuit Ua close to the dependent unit circuit Ub.

As described above, in the present embodiment, the electro-optical element Eb close to one electro-optical element Ea among the plurality of electro-optical elements Eb is largely influenced by the correction of the light intensity of the electro-optical element Ea. Accordingly, it is possible to efficiently correct the unevenness of the light intensity between the electro-optical elements Eb driven by the dependent unit circuit Ub while sufficiently reducing the size of the drive circuit, by interposing the plurality of dependent unit circuit Ub between the independent unit circuits Ua. In the present embodiment, since the current value of the drive current $I_{DR}$ of the dependent unit circuit Ub is set according to the gain coefficients of the transistor $R_1$ and $R_2$, a special element for adjusting the drive current $I_{DR}$ of the dependent unit circuit Ub is not necessary. Accordingly, it is possible to suppress the unevenness of the light intensity with high precision while maintaining the drive circuit 20 having the same size as the third embodiment.

E: Modified Example

A variety of modifications may apply to the above-described embodiments. The detailed modified examples are as follows. The following examples may be properly combined.

(1) Modified Example 1

Figure 9:
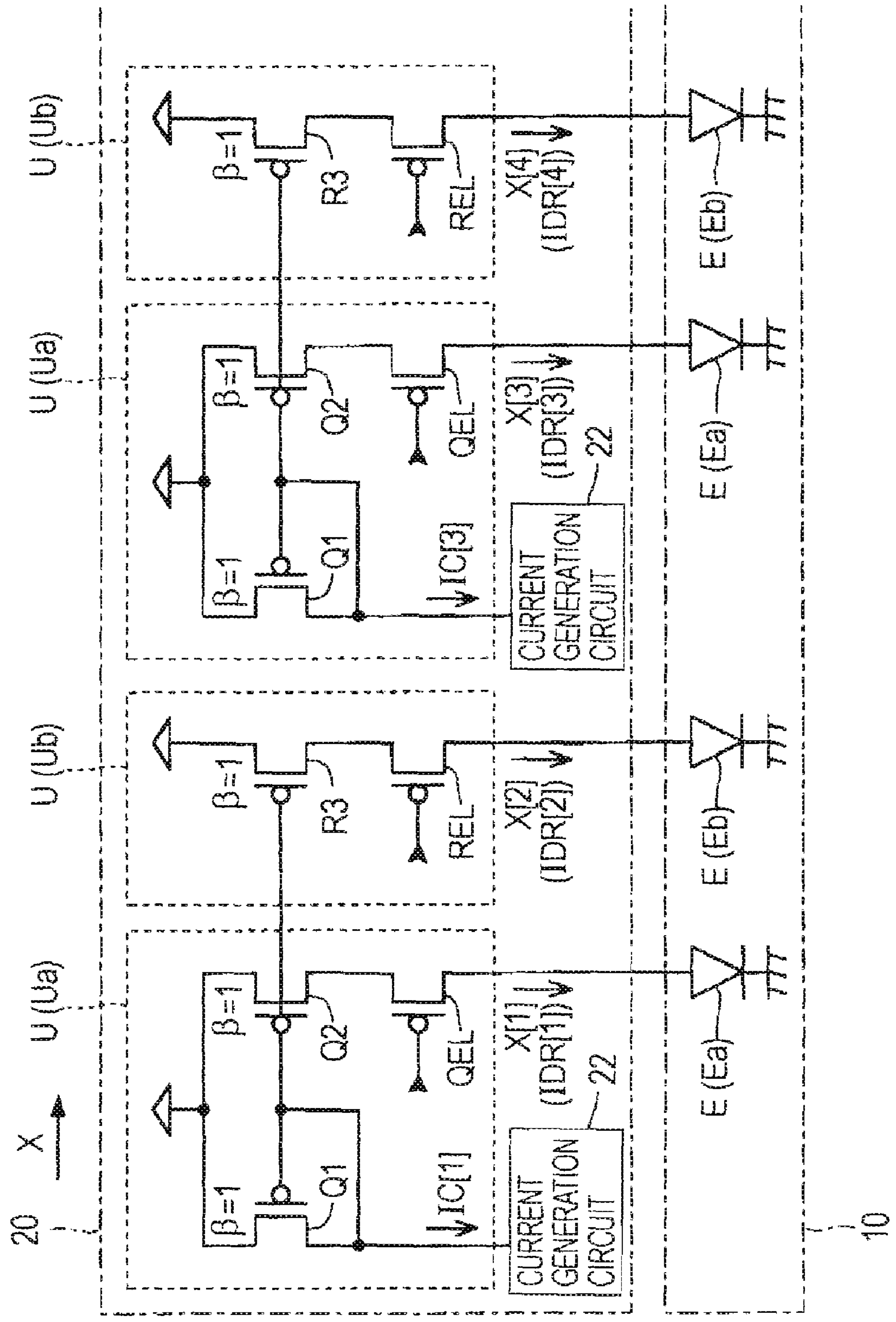
FIG. 9 is a block diagram showing the detailed configuration of a drive circuit and an element portion according to a modified embodiment.

Although, in the above-described embodiments, the configuration in which the drive current $I_{DR}$ of one dependent unit circuit Ub is set according to the control signals $I_c$ of two independent unit circuits Ua is described, as shown in FIG. 9, a configuration in which the drive current $I_{DR}$ of one dependent unit circuit Ub is set according to the control signal $I_c$ of one independent unit circuit Ua may be employed. As shown in FIG. 9, an $i^{th}$ dependent unit circuit Ub includes a transistor $R_3$ which configures a current mirror circuit together with transistors $Q_1$ and $Q_2$ of an $(i-1)^{th}$ independent unit circuit Ua. The gain coefficient β of the transistor $R_3$ is equal to that of the transistor $Q_1$ or $Q_2$ (β=1). Accordingly, the drive current $I_{DR}$[i] of the $i^{th}$ dependent unit circuit Ub is set to the same current value as the control current $I_c$[i] of the $(i-1)^{th}$ independent unit circuit Ua.

A configuration in which the drive current $I_{DR}$ of one dependent unit circuit Ub is set according to the control signals $I_c$ of at least three independent unit circuits Ua may be employed. For example, a configuration in which the drive current $I_{DR}$ of one dependent unit circuit Ub is set according to an average (arithmetic average or weighted average) of the control signals $I_c$ of four independent unit circuits Ua arranged in an X direction may be employed. As described above, in the suitable aspect of the invention, a configuration in which one current generation circuit 22 is shared by a plurality of unit circuits U is employed.

(2) Modified Example 2

Although, in the above-described embodiments, a configuration in which the drive current $I_{DR}$ is corrected according to the correction data D, a target corrected according to image data D is properly changed. For example, in an electro-optical device using an electro-optical element (for example, a liquid crystal element) of which the gray scale varies depending on the application of a voltage, since a drive signal X becomes a voltage signal, the voltage value of the drive signal X may be corrected according to the correction data D. That is, a voltage generation circuit for generating a control voltage VC according to the correction data D is provided for independent unit circuits Ua instead of the current generation circuit 22 shown in FIG. 1, and the drive signal X generated by the independent unit circuit Ua is set by the voltage value according to the control voltage VC. The drive signal X generated by a dependent unit circuit Ub is set by the voltage value according to the control voltage VC of one or a plurality of independent unit circuits Ua close to the dependent unit circuit Ub. By the above-described configuration, the same effects as the above-described embodiments are obtained.

(3) Modified Example 3

An organic light-emitting diode element is only an example of the electro-optical element. In the electro-optical element according to the invention, differentiation between a self-emission type element and a non-emission type element (for example, a liquid crystal element) for varying the transmissivity of external light or differentiation between a current driving type element driven by supplying current and a voltage driving type element driven by applying a voltage is not required. For example, a variety of electro-optical elements such as an inorganic EL element, a field emission (FE) element, a surface-conduction electron-emitter (SE) element, a ballistic electron surface emitting (BS) element, a light-emitting diode element, a liquid crystal element, an electrophoretic migration element, and an electrochromic element may be used in the invention.

F: Application Example

Figure 10:
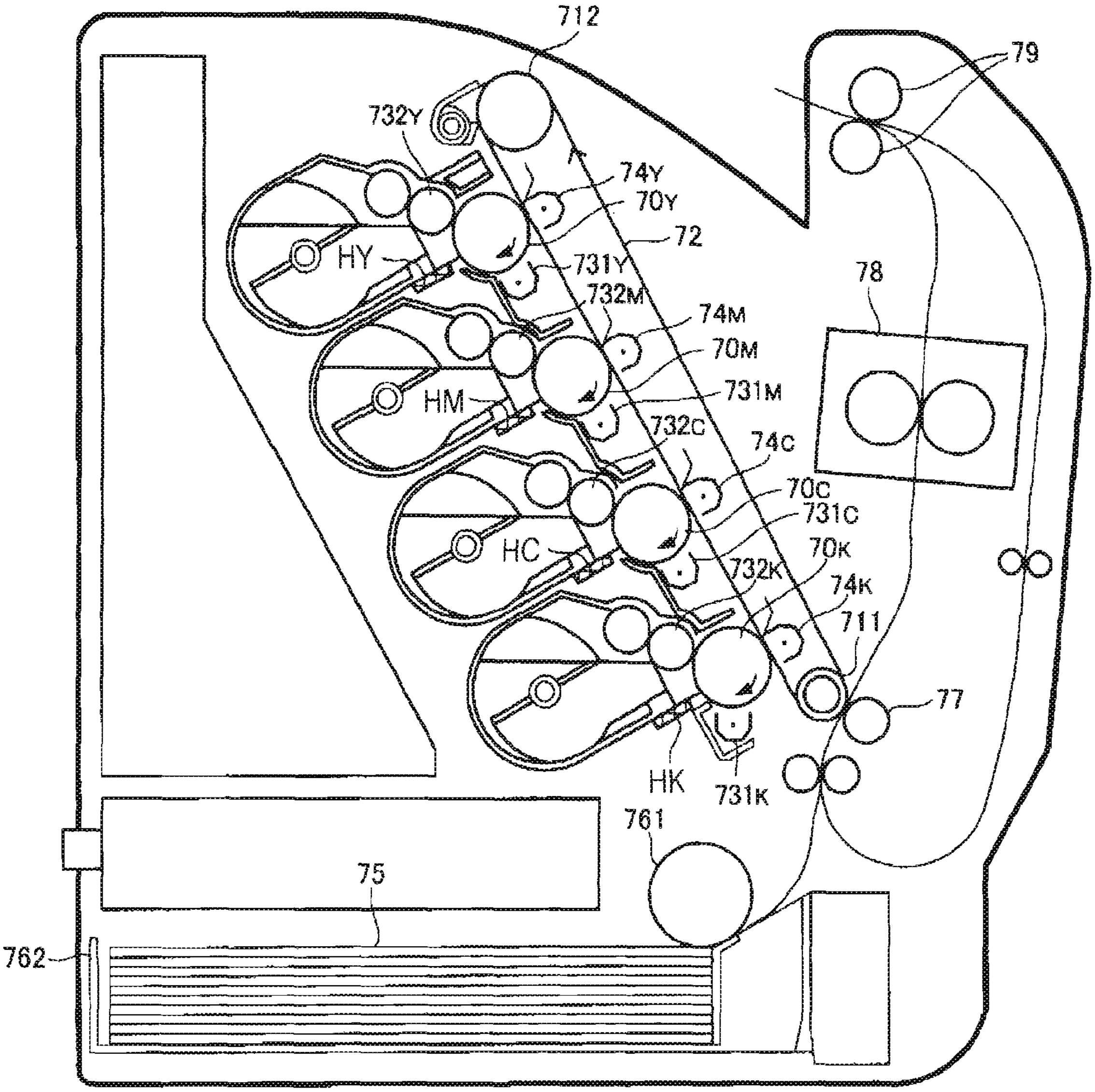
FIG. 10 is a cross-sectional view showing an aspect (image forming apparatus) of an electronic apparatus.

The detailed embodiments of an electronic apparatus (image forming apparatus) using an electro-optical apparatus according to the invention will be described. FIG. 10 is a cross-sectional view showing the configuration of an image forming apparatus which employs the electro-optical device H according to each of the above-described embodiments. The image forming apparatus is a tandem type full-color image forming apparatus and includes four electro-optical devices H (HK, HC, HM and HY) according to the above-described embodiments and four photosensitive drums 70, (70K, 70C, 70M and 70Y) corresponding to the electro-optical devices H. One of the electro-optical devices H is provided to face an image forming surface (outer circumferential surface) of the photosensitive drum 70 corresponding thereto. The subscripts "K", "C", "M" and "Y" of the reference numerals indicate that the elements are used to form images of black (K), cyan (C), magenta (M) and yellow (Y).

As shown in FIG. 10, an endless intermediate transfer belt 72 is stretched over a driving roller 711 and a driven roller 712. The four photosensitive drums 70 are arranged in the vicinity of the intermediate transfer belt 72 at a predetermined interval. Each photosensitive drum 70 rotates in synchronization with the drive of the intermediate transfer belt 72.

Corona chargers 731 (731K, 731C, 731M and 731Y) and developers 732 (732K, 732C, 732M and 732Y) are arranged in the vicinities of the photosensitive dreams 70 in addition to the electro-optical devices H. The corona chargers 731 uniformly charge the image forming surfaces of the photosensitive drum 70 corresponding thereto. The charged image forming surfaces are exposed by the electro-optical devices H to form electrostatic latent images. The developers 732 attach development agents (toner) to the electrostatic latent images to form an image (visible image) on the photosensitive drums 70.

As described above, full-color images are formed by sequentially transferring (primary transfer) the images of respective colors (black, cyan, magenta and yellow) formed on the photosensitive drums 70 onto the surface of the intermediate transfer belt 72. Four primary transfer corotrons (transferring elements) 74 (74K, 74C, 74M and 74Y) are provided inside the intermediate transfer belt 72. The primary transfer corotrons 74 electrostatically suck the images from the photosensitive drams 70 to transfer the image onto the intermediate transfer belt 72 passing through gaps between the photosensitive drums 70 and the primary transfer corotrons 74.

A sheet (recording material) 75 is fed from a sheet feeding cassette 762 one by one by a pickup roller 761 and is carried to a nip between the intermediate transfer belt 72 and a secondary transfer roller 77. The full-color image formed on the surface of the intermediate transfer belt 72 is transferred (secondary transfer) on one surface of the sheet 75 by the secondary transfer belt 77 and is fixed to the sheet 75 by passing through a pair of fixing rollers 78. A pair of ejection rollers 79 ejects the sheet 75 oh which the image is fixed by the above process.

Since the organic light-emitting diode element is used as a light source (exposure means) in the above-described image forming apparatus, the apparatus is miniaturized compared with a configuration using a laser scanning optical system. The electro-optical device H may apply to an image forming apparatus having a configuration other than the above-described configuration. For example, the electro-optical device H may be used in a rotary development type image forming apparatus, an image forming apparatus in which an image is directly transferred from a photosensitive drum onto a sheet without using an intermediate transfer belt, or an image forming apparatus for forming a monochromic image.

The use of the electro-optical device H is not limited to the exposure of an image carrier. For example, the electro-optical device H is employed in an image reading apparatus as an illumination apparatus for irradiating light onto a read target such as an original material. As this kind of image reading apparatus, there are a reading portion of a copier or a facsimile machine, a barcode reader, and a two-dimensional image code reader for reading a two-dimensional image code such as QR code (registered trademark.

The electro-optical device in which the electro-optical elements are arranged in a matrix is used as display devices of a variety of electronic apparatuses. As the electronic apparatus according to the invention, there are a mobile personal computer, a cellular phone, a personal digital assistants (PDA), a digital camera, a television set, a video camera, a car navigation system, a pager, an electronic organizer, an electronic paper, an electronic calculator, a word processor, a workstation, a videophone, a POS terminal, a printer, a scanner, a copier, a video player, and a touch-panel-equipped device.

The entire disclosure of Japanese Patent Application No. 2006-215386, filed Aug. 8, 2006 is expressly incorporated by reference herein.

What is claimed is:

1. An electro-optical device comprising:

a plurality of electro-optical elements for which the intensities of emitted light are controlled according to drive signals;

a plurality of unit circuits which output the drive signals; and a plurality of signal generation circuits which generate control signals according to correction data, wherein the plurality of unit circuits include:

a plurality of independent unit circuits which generate the drive signals according to the control signal generated by any of the plurality of signal generation circuits and gray scale levels of the electro-optical elements, and a dependent unit circuit which generates the drive signal according to a control signal supplied to a first independent unit circuit and a control, signal supplied to a second independent unit circuit among the plurality of independent unit circuits and the gray scale levels of the electro-optical elements.

2. The electro-optical device according to claim 1, wherein the plurality of electro-optical elements are arranged in a predetermined direction, and wherein an electro-optical element driven by the first independent unit circuit and an electro-optical element driven by the second independent unit are arranged with an electro-optical element driven by the dependent unit circuit interposed therebetween in the predetermined direction.

3. The electro-optical device according to claim 1, wherein the plurality of electro-optical elements are arranged in plural rows including a first row and a second row, wherein the dependent unit circuit for driving the electro-optical elements of the first row generates the drive signal according to the control signals supplied to the first and second independent unit circuits for driving the electro-optical elements of the first row, and wherein the dependent unit circuit for driving the electro-optical elements of the second row generates the drive signal according to the control signals supplied to the first and second independent unit circuits for driving the electro-optical elements of the second row.

4. The electro-optical device according to claim 1, wherein the plurality of unit circuits include a plurality of dependent unit circuits which generate the drive signals according to the control signal supplied to the first independent unit circuit, the control signal supplied to the second independent unit circuit and the gray scale levels of the electro-optical elements.

5. The electro-optical device according to claim 4, wherein each of the plurality of dependent unit circuits generates the drive signals according to a weighted average of the control signals, among which weighted values increase, in the control signal supplied to the independent unit circuit corresponding to an electro-optical element close to the electro-optical element driven by the dependent unit circuit.

6. The electro-optical device according to claim 1, wherein the signal generation circuits generate control currents having current values according to the correction data as the control signals, wherein each of the independent unit circuits includes a first transistor in which the control current flows and a second transistor configuring a current mirror circuit together with the first transistor, and wherein the dependent unit circuit includes a third transistor configuring the current mirror circuit together with the first transistor of the first independent unit circuit and a fourth transistor configuring the current mirror circuit together with the first transistor of the second independent unit circuit, and generates the drive signal by adding the currents flowing in the third transistor and the fourth transistor.

7. The electro-optical device according to claim 6, wherein the plurality of unit circuits include a plurality of dependent unit circuits which generate the drive signals according to the control signal supplied to the first independent unit circuit, the control signal supplied to the second independent unit circuit and the gray scale levels of the electro-optical elements, and wherein, among the plurality of dependent unit circuits, a gain coefficient of the third transistor is large in a dependent unit circuit corresponding to the electro-optical element close to an electro-optical element driven by the first independent unit circuit and a gain coefficient of the fourth transistor is large in a dependent unit circuit corresponding to the electro-optical element close to an electro-optical element driven by the second independent unit circuit.

8. The electro-optical device according to claim 6, wherein each of the independent unit circuits includes a drive control transistor which is turned on for a length of time according to the gray scale level of the electro-optical element provided on a path of current flowing in the second transistor, and wherein each of the dependent unit circuits includes a drive control transistor which is provided on a path of current obtained by adding current flowing in the third transistor and current flowing in the fourth transistor and is turned on for a length of time according to the gray scale level of the electro-optical element.

9. An electro-optical device comprising:

an electro-optical element for which the intensity of emitted light is controlled according to a drive signal;

a signal generation circuit which generates a control signal according to correction data; and a plurality of unit circuits, each of which generates the drive signal according to the control signal generated by the signal generation circuit and gray scale level of the electro-optical element.

10. An electronic apparatus comprising the electro-optical device according to claim 1.

11. A drive circuit for driving a plurality of electro-optical elements by supplying drive signals, the drive circuit comprising:

a plurality of unit circuits which output the drive signals; and a plurality of signal generation circuits which generate control signals according to correction data, wherein the plurality of unit circuits include:

a plurality of independent unit circuits which generate the drive signals according to the control signal generated by any of the plurality of signal generation circuits and gray scale levels of the electro-optical elements, and a dependent unit circuit which generates the drive signal according to a control signal supplied to a first independent unit circuit and a control signal supplied to a second independent unit circuit among the plurality of independent unit circuits and the gray scale levels of the electro-optical elements.

* * * * *